United States Patent
Bidmead et al.

(10) Patent No.: US 12,172,619 B2
(45) Date of Patent: Dec. 24, 2024

(54) BRAKE CONTROL SYSTEM

(71) Applicant: Airbus Operations Limited, Bristol (GB)

(72) Inventors: Ashley Bidmead, Bristol (GB); Florian Becher, Bristol (GB); Andrew Hebborn, Bristol (GB)

(73) Assignee: Airbus Operations Limited, Bristol (GB)

( * ) Notice: Subject to any disclaimer, the term of this patent is extended or adjusted under 35 U.S.C. 154(b) by 295 days.

(21) Appl. No.: 17/703,588

(22) Filed: Mar. 24, 2022

(65) Prior Publication Data
US 2022/0306057 A1    Sep. 29, 2022

(30) Foreign Application Priority Data
Mar. 25, 2021    (GB) ..................................... 2104218

(51) Int. Cl.
| | | |
|---|---|---|
| *B60T 8/00* | (2006.01) | |
| *B60T 8/17* | (2006.01) | |
| *B64C 25/42* | (2006.01) | |

(52) U.S. Cl.
CPC .......... *B60T 8/1703* (2013.01); *B64C 25/426* (2013.01)

(58) Field of Classification Search
CPC ....... B60T 8/1703; B60T 8/00; B64C 25/426; B64C 27/04; B64C 29/02
USPC .............................................. 701/3
See application file for complete search history.

(56) References Cited

U.S. PATENT DOCUMENTS

| | | | | |
|---|---|---|---|---|
| 2005/0224642 | A1* | 10/2005 | Sullivan | B60L 7/26 244/111 |
| 2006/0186267 | A1* | 8/2006 | Steiner | B60T 8/1703 244/110 A |
| 2007/0084682 | A1* | 4/2007 | Griffith | B60T 13/741 188/156 |
| 2018/0215357 | A1* | 8/2018 | Cahill | B60T 15/041 |
| 2021/0016889 | A1* | 1/2021 | Zarate | B64D 37/005 |
| 2021/0107664 | A1* | 4/2021 | Rabbi | B64D 33/08 |
| 2021/0380224 | A1* | 12/2021 | Clark | B64C 13/50 |

FOREIGN PATENT DOCUMENTS

| | | |
|---|---|---|
| EP | 3 319 296 | 5/2018 |
| EP | 3 357 772 | 8/2018 |

OTHER PUBLICATIONS

Combined Search and Examination Report for GB2104218.9, dated Dec. 22, 2021, 10 pages.

* cited by examiner

*Primary Examiner* — Shardul D Patel
(74) *Attorney, Agent, or Firm* — Nixon & Vanderhye P.C.

(57) ABSTRACT

A brake control system 200 and method 300 for controlling a park brake of an aircraft including a controller 201 configured to cause an increase in a brake torque of the park brake based of an indication to the controller. The indication is generated in response to touchdown of the aircraft.

15 Claims, 2 Drawing Sheets

BRAKE CONTROL SYSTEM

RELATED APPLICATION

This application incorporates by reference and claims priority to United Kingdom patent application GB 2104218.9, filed Mar. 25, 2021.

TECHNICAL FIELD

The present invention relates to a brake control system for an aircraft, an aircraft comprising the brake control system, a method of controlling a park brake of an aircraft, and a non-transitory computer readable storage medium.

BACKGROUND

Some aircraft, such as helicopters, are capable of landing vertically and independently of a ground speed. Beneficially, this allows such aircraft to land on a variety of restricted landing surfaces that are restricted in terms of available surrounding space. Such restricted landing surfaces may comprise natural or man-made surfaces, may be moveable relative to their surroundings (for example, water-based landing platforms on waterborne vessels such as ships and oil rigs, or land-based landing platforms such as high-rise buildings (for example, hotels), hospitals or helipads between ground-based obstacles), and/or may be exposed to harsh environments. Given the landing conditions of these restricted landing surfaces, such aircraft are susceptible to movement on landing because of a reduced impact of lift forces to control a position of the aircraft relative to the restricted landing surface.

Modern aircraft are fitted with brakes that can be arranged in a parked state. Such brakes are referred to as park brakes. When the aircraft is airborne, applying the park brake locks the wheels in position to prevent the wheels from rolling on touchdown of the aircraft. This enables a punctual landing of the aircraft by mitigating a susceptibility of the aircraft to unintentional movement when landing on a restricted landing surface.

Abrupt changes in the landing conditions, such as a gust of wind or rocking motion of the landing surface, can act against a park brake on touchdown. This can stress a landing gear (comprising the park brakes, wheel and tyres) and/or airframe of the aircraft. Conditions of the aircraft, such as an asymmetric centre of gravity or asymmetric braking performance, can also compromise the effectiveness of preventing any rolling movement of the aircraft when landing on the landing surface. Any forward speed of the aircraft, relative to the restricted landing surface, can cause additional load through the landing gear on landing, and transmission of such loads through the aircraft can compromise an integrity of the aircraft, such as a structural integrity of the airframe.

Increases landing forces may lead to a braking capacity of the park brake being exceeded, which lead to a brake slip momentarily, whereby the wheels roll against the park brake. Increasing a braking performance of the park brake can help to mitigate a chance of a brake slip but can add weight to the aircraft and further increase stress on the landing gear that is subsequently transmitted through the airframe. Brake slip and/or heavy braking can negatively affect a comfort in the aircraft due to an influence on vehicle dynamics caused by resonance, which may result in a judder or skip of the aircraft. To minimise the chance of brake slip, the forward speed of the aircraft can be tightly controlled when landing on restricted landing surfaces to protect an integrity of the aircraft. In extreme conditions, any relative movement, between the restricted landing surface and aircraft, is heightened and the chance of brake slip and stress on aircraft is increased.

The present invention mitigates the above-mentioned problems and accordingly may provide an improved brake control system for an aircraft.

SUMMARY

A first aspect of the present invention provides a brake control system for controlling a park brake of an aircraft, the brake control system comprising a controller that is configured to cause an increase in a brake torque of the park brake on the basis of an indication to the controller, the indication being generated in response to touchdown of the aircraft.

Optionally, the indication is generated in response to detection by a sensor that the aircraft is no longer in-flight. Optionally, the sensor is configured to detect a condition of a landing gear of the aircraft. Optionally, the condition is a change of a suspension component, such as a change in a length of a telescopic strut of the landing gear. Optionally, the sensor is configured to detect an environmental condition of the aircraft, such as an altitude. Optionally, the sensor is configured to detect a proximity of the aircraft to a landing surface. Optionally, the sensor is configured to detect a contact between a tyre and a landing surface.

Optionally, the controller is configured to cause a progressive increase in the brake torque of the park brake. Optionally, the progressive increase is continuous. Optionally, the progressive increase is a performed over a predetermined period of time. Optionally, the progressive increase is linear. Optionally, the progressive increase is non-linear.

Optionally, the controller is configured to cause the increase in the brake torque of the park brake according to a predetermined profile. Optionally, the controller is configured to cause the increase in the brake torque of the park brake on the basis of a selection of a predetermined profile from a plurality of predetermined profiles. Optionally, the selection of the predetermined profile is on the basis of an aircraft condition indicated to the controller. Optionally, the aircraft condition is indicative of a weight or a centre of gravity of the aircraft. Optionally, the aircraft condition is indicative of a speed of the aircraft. Optionally, the speed of the aircraft comprises a ground speed. Optionally, the selection of the predetermined profile is on the basis of one or more external conditions external to the aircraft. Optionally, the one or more external conditions comprises an indication of a wind speed generated by a wind speed sensor arranged to determine a wind speed with respect to the aircraft.

Optionally, the controller is configured to cause an initial brake torque to increase to a final brake torque by at least about 5% on the basis of the indication to the controller on touchdown. Optionally, the controller is configured to cause an initial brake torque to increase to a final brake torque by between about 5% and 95% on the basis of the indication to the controller on touchdown. Optionally, the controller is configured to cause an initial brake torque to increase to a final brake torque by between about 20% and 80% on the basis of the indication to the controller on touchdown. Optionally, the controller is configured to cause the initial brake torque to at least double to the final brake torque on the basis of the indication to the controller on touchdown. Optionally, the controller is configured to cause the initial brake torque to increase to the final brake torque by a factor of between about 2 and about 10, on the basis of the indication to the controller on touchdown. Optionally, the controller is configured to cause the initial brake torque to increase to the final brake torque by a factor of between about 4 and about 6, on the basis of the indication to the controller on touchdown. Optionally, the controller is configured to cause the initial brake torque to increase to the final brake torque by a factor of about 5, on the basis of the indication to the controller on touchdown.

Optionally, the controller is configured to cause contact between braking surfaces of the park brake when the aircraft is airborne before touchdown. Optionally, one of the braking surfaces of the park brake is a surface comprised by a rotor and another of the braking surfaces is a surface comprised by a stator. Optionally, the controller is configured to cause the increase in the brake torque of the park brake by controlling a relative position between the rotor and stator.

Optionally, the controller is configured to cause application of an initial brake torque of the park brake when the aircraft is airborne before touchdown. Optionally, the initial brake torque is greater than about 0% of a maximum brake torque and less than about 100% of the maximum brake torque. Optionally, the initial brake torque is greater than about 10% of a maximum brake torque and less than about 90% of the maximum brake torque. Optionally, the initial brake torque is greater than about 10% of a maximum brake torque and less than about 50% of the maximum brake torque. Optionally, the initial brake torque is about 20% of a maximum brake torque. Optionally, the initial brake torque is selected on the basis of an objective for braking the aircraft on touchdown from a plurality of objectives for braking the aircraft on touchdown. Optionally, at least one of the plurality of objectives comprises a location for landing the aircraft. Optionally, the location comprises a waterborne vessel, such as a ship or an oil rig.

Optionally, the controller is configured to cause an increase in a brake torque of the park brake on the basis of a time delay following the indication to the controller. Optionally, the time delay is predetermined. Optionally, a predetermined profile comprises the time delay. Optionally, an objective for braking the aircraft comprises the time delay.

Optionally, the controller is configured to cause an increase in a brake torque of a plurality of park brakes on the basis of the indication to the controller.

A second aspect of the present invention provides an aircraft comprising the brake control system according to the first aspect.

Optionally, the aircraft is a vertical and/or short take-off and landing (V/STOL) aircraft. Optionally, the aircraft is a vertical take-off and landing (VTOL) aircraft. Optionally, the aircraft is a fixed-wing aircraft. Optionally, the aircraft is a rotary-wing aircraft. Optionally, the aircraft is a helicopter. Optionally, the aircraft is an unmanned aerial vehicle (UAV).

A third aspect of the present invention provides a method of controlling a park brake of an aircraft, the method comprising causing an increase in a brake torque of the park brake on the basis of an indication to the controller, the indication being generated in response to touchdown of the aircraft.

A fourth aspect of the present invention provides a non-transitory computer readable storage medium comprising a set of computer-readable instructions stored thereon, which, when executed by a controller of a brake control system for an aircraft, cause the controller to cause an increase in a brake torque of the park brake on the basis of an indication to the controller, the indication being generated in response to touchdown of the aircraft.

A fifth aspect of the present invention provides a brake management tool for managing operation of a park brake of an aircraft, the brake management tool comprising a controller that is configured to cause a clamping torque of the park brake to rise on detection of a signal issued to the controller upon landing to halt the aircraft.

A sixth aspect of the present invention provides an avionics system comprising the brake control system according to the first aspect.

The above aspects of the present invention provide for improved brake control of an aircraft. The ability to protect an integrity of the aircraft, such as the airframe, wheels, and/or park brakes is increased by the above aspects of the present invention. A settling of the aircraft is improved because the effects of judder or skipping are reduced.

Any optional feature(s) of any one aspect of the present invention may be equally applied to any other aspect(s) of the present invention, where appropriate.

BRIEF DESCRIPTION OF THE DRAWINGS

Embodiments of the invention will now be described, by way of example only, with reference to the accompanying drawings, in which.

DETAILED DESCRIPTION

Figure 1:
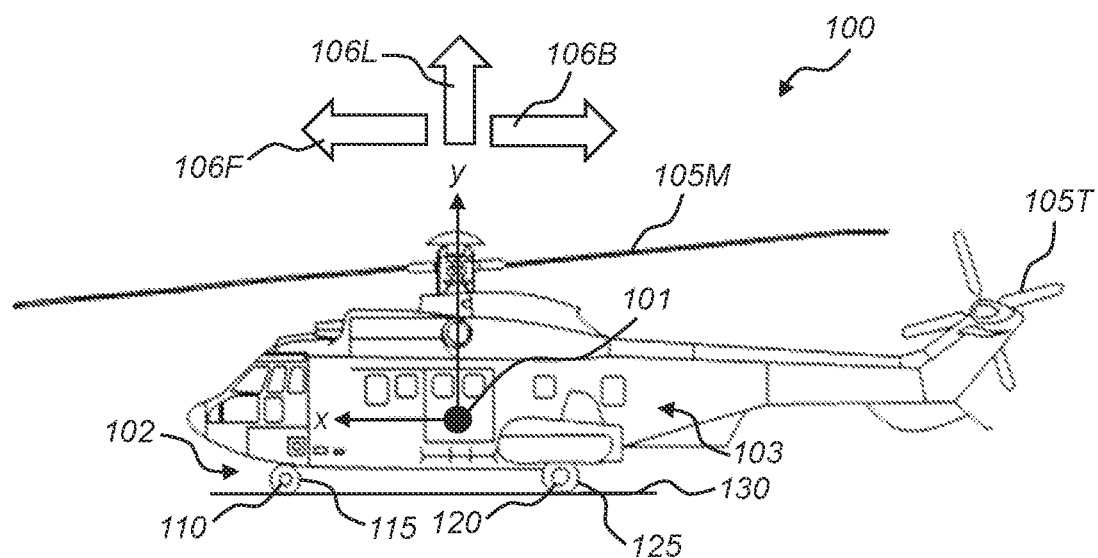
FIG. 1 is a schematic diagram showing a side view of an aircraft according to an embodiment.

FIG. 1 is a side view of an aircraft 100. In this embodiment, the aircraft is a helicopter, which is an example of a rotary-wing aircraft capable of landing vertically and independently of a ground speed.

The aircraft 100 comprises a propulsion device, in the form of a main rotor 105M, and an angular control device, in the form of a tail rotor 105T. The propulsion device is arranged to provide a lift force 106L and propel the aircraft in a forward and backward direction according to a forward thrust 106F and a backward thrust 106B, respectively. The angular control device is arranged to control a yawing moment of the aircraft about a centre of gravity 101 of the aircraft so that the aircraft can be steered about a vertical axis y of the aircraft according to a sideways thrust produced by the angular control device.

In this embodiment, the main rotor 105M and tail rotor 105T are powered by a power unit, in the form of an engine 103. In other embodiments, the power unit may comprise an electrical motor, wherein the motor electrical may be powered by a battery.

The aircraft 100 is arranged to pitch about a longitudinal axis of the aircraft, denoted by an arrow labelled x, and roll about a third, lateral axis of the aircraft (not shown) that is perpendicular to both the vertical axis y and longitudinal axis of the aircraft. Manipulation of the aircraft in flight is dependent on an operation of the main rotor 105M and tail rotor 105T with respect to the weight and the centre of gravity 101 of the aircraft.

The aircraft 100 comprises a landing gear 102 which supports the aircraft when the aircraft is on a landing surface 130, such as a helipad, and controls the movement of the aircraft during ground manoeuvres such as landing and take-off The landing gear comprises a set of wheels. Each wheel comprises a park brake 110, 120 and a tyre 115, 125. In this embodiment, the landing gear comprises two front wheels 115 and two front park brakes 110, and two rear wheels 125 and two rear park brakes 120. In other embodiments, a different number of wheels and park brakes may be used.

In this embodiment, each tyre is a pneumatic tyre and filled with air under pressure. Each park brake comprises a stator in the form of a calliper and a rotor in the form of a disc. The park brakes may be manually controlled by a flight crew (for example, a pilot) using a foot brake. To park the aircraft, a park brake function is used. In this embodiment, the flight crew initiate the park function. In other embodiments, the park function may be initiated automatically according to an input from a sensor, such as a sensor indicating a proximity of the aircraft to the landing surface 130.

In the view shown in FIG. 1, the aircraft 100 is on the landing surface. In this embodiment, the landing surface is restricted insofar as the landing surface has a length that is less than a span of the main rotor 105M. In other embodiments, the landing surface can have a length, such as a diameter, that is less than double a span of the main rotor 105M.

Figure 2:
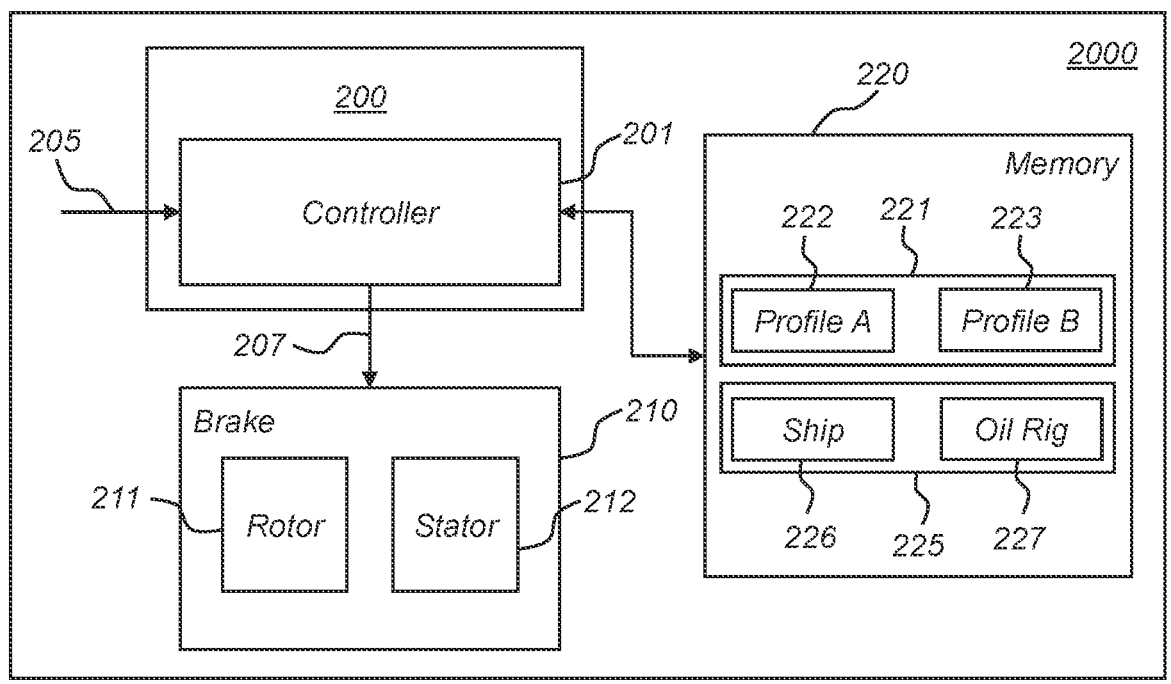
FIG. 2 is a schematic diagram showing an avionics system according to an embodiment.

FIG. 2 illustrates an avionics system 2000 according to an embodiment. The avionics system comprises a brake control system 200, a memory 220, and a park brake 210. In other embodiments, the memory may be omitted from the avionics system, for example when the memory is located off the aircraft comprising the avionics system.

The brake control system 200 is for controlling a park brake of an aircraft, such as the park brakes 110, 120 of the aircraft 100 described in relation to the embodiment of FIG. 1. The brake control system is to provide an improved landing procedure of the aircraft by managing movement of the aircraft on touchdown with an integrity of the aircraft. The brake control system is a brake management tool for managing operation of a park brake of an aircraft.

The brake control system 200 comprises a controller 201. In some embodiments, the controller is a processor or one or more processors. The controller 201 is configured to cause a clamping torque of a park brake 210 to rise on detection of an input signal 205 issued to the controller 201 upon landing of the aircraft 100 to halt the aircraft. In this embodiment, the controller issues an output signal 207 to the park brake to cause the clamping torque. The park brake comprises a rotor 211 in the form of a brake disc that is configured to rotate with a wheel, and a stator 212 in the form of a brake calliper that is configured to be fixed with respect to a rotation of the wheel. Each of the rotor and stator comprise a braking surface, such that movement of the stator towards the rotor 211 is configured to cause contact between the braking surfaces and impart the clamping torque of the park brake.

Put in another way, the controller 201 of the brake control system 200 is configured to cause an increase in a brake torque of the park brake 210 on the basis of an indication, by the input signal 205, to the controller, that is generated in response to a touchdown of the aircraft 100. Advantageously, a chance of brake slip is reduced and control of movement of the aircraft on touchdown, such as a retardation, is improved. This helps to preserve a structural integrity of the airframe and provide improved comfort to occupants of the aircraft.

In this embodiment, the controller 201 of the brake control system 200 is configured to cause a non-instantaneous increase in the brake torque of the park brake 210 in response to the touchdown of the aircraft 100. The increase is progressive in that the brake torque increases gradually over a period of time. The progressive increase in the brake torque of the park brake may be completed within a predetermined period of time, for example less than or equal to a second. That is, the brake control system is configured to cause the progressive increase in the brake torque of the park brake within the predetermined period of time after detection of touchdown of the aircraft. This enables a punctual landing to be performed in a such a way that smaller loads, arising from forward speed of the aircraft on touchdown, are transferred to the landing gear and airframe, thereby better preserving an integrity of the aircraft.

In this embodiment, a rate of the increase is constant between an initial brake torque and a final brake torque. That is, the increase in brake torque is linear between the initial brake torque and the final brake torque. In other embodiments, the rate of the increase may vary between the initial brake torque and the final brake torque. For example, the rate of increase from the initial brake torque may decrease towards the final brake torque. In some embodiments, the rate of increase may comprise a higher rate of increase before a lower rate of increase.

In this embodiment, the controller 201 is activated by a command from the flight crew. The command is activated when the aircraft 100 is in-flight. That is, the controller is configured to cause application of an initial brake torque of the park brake when the aircraft is airborne before touchdown. The command indicates that a park brake is required when landing the aircraft. In some embodiments, the aircraft may automatically detect that the park brake is required because the aircraft is approaching a landing area. In this embodiment, the controller sends an output signal 207 to the park brake 210 to cause application of an initial brake torque of the park brake.

In this embodiment, the brake torque of the park brake 210 is known based on a detected position of the rotor 211 relative to the and stator 211. The stator, in the form of a brake calliper, comprises an actuatable piston that moves a brake pad towards the rotor in the form of a brake disc. When contact is made between the braking surfaces of the brake piston (for example, between a surface of the brake pad and a surface of the brake disc), an indication of contact is provided to the controller, for example an increase of current. The indication of contact represents a reference point of the park brake. Each displacement of the actuatable piston away from the reference point has a corresponding known brake torque. The known brake torques range from a minimum or zero brake torque to a maximum brake torque. The brake torque may therefore be said to have a range of between 0% and 100% of the maximum brake torque.

In this embodiment, the initial brake torque is about 20% of the maximum brake torque. In other embodiments, the initial brake torque may be different. For example, the initial brake torque may be greater than about 0% of the maximum brake torque and less than about 100% of the maximum brake torque. In some examples, the initial brake torque may be 0% of the maximum brake torque. Reducing the initial brake torque away from 100% of the maximum brake torque enables a tendency for brake slip to reduce, whilst providing sufficient braking performance so that rolling motion of the wheels can be resisted.

As noted above, upon receiving an indication that the aircraft has touched down, the controller 201 causes an increase in the brake torque of the park brake 210. More particularly, the controller causes a gradual increase in the brake torque from the initial brake torque, applied prior to touchdown, to a final brake torque. In this embodiment, the final brake torque is 100% of the maximum brake torque. However, the final brake torque could conceivably be less than 100%. The final brake torque corresponds to the brake torque that is maintained when the aircraft is in a parked state.

The controller 201 of the brake control system 200 is able to communicate with the memory 220 to access information from the memory. The information comprises data about the application of brake torque by the controller for use on touchdown of the aircraft 100. In this embodiment, the memory comprises two predetermined profiles 221 comprising the information. In other embodiments, the memory may comprise a single predetermined profile or a plurality of predetermined profiles. The controller is configured to cause the increase in the brake torque of the park brake according to a selectable predetermined profile 221, 223. That is, the controller is configured to cause the increase in the brake torque of the park brake on the basis of a selection of a predetermined profile from a plurality of predetermined profiles.

A first predetermined profile 222, herein referred to as "Profile A", comprises a different increase in the brake torque of the park brake compared to a second predetermined profile 222, herein referred to as "Profile B". The increase under Profile A may be more gradual than an increase under Profile B. Selection of the predetermined profile may be manual or automated based on one or more conditions of the aircraft 100 or one or more environmental conditions impacting the aircraft. For example, the selection of the predetermined profile may be based on an aircraft condition indicated to the controller 201. In some embodiments, the aircraft condition is indicative of a weight or a centre of gravity 101 of the aircraft. In other embodiments, the aircraft condition is indicative of a speed of the aircraft, such as a ground speed, as detected by a speed sensor. The one or more environmental conditions comprise an external condition that is external to the aircraft. An example of an external condition is a wind speed generated by a wind speed sensor.

Additionally, the memory 220 comprises two objectives 225 for braking the aircraft on touchdown. In other embodiments, the memory may comprise a single objective or a plurality of objectives. A first objective 226, herein referred to as "Ship", comprises a different initial brake torque of the park brake compared to a second objective 227, herein referred to as "Oil Rig". Each objective is indicative of a location for landing the aircraft 100. Although both the first and second objectives are indicative of a waterborne landing condition, the first objective corresponds to landing on a ship, whereas the second objective corresponds to landing on an oil rig. The initial brake torque under the first objective may be greater than the initial brake torque under the second objective, for example. Selection of the objective may be manual or automated based on one or more conditions indicative of the landing environment.

In this embodiment, indication to the controller 201 generated in response to touchdown of the aircraft 100 is based on the input signal 205. The input signal indicates to the controller that the aircraft is no longer in-flight and has touched down on a landing surface, such as the restricted landing surface 130 shown in FIG. 1. In this embodiment, the input signal is sent based on a "weight-on-wheels" condition resulting from a detection, by a sensor, of a change in a length of a telescopic strut of the landing gear. The "weight-on-wheels" condition indicates that the aircraft is no longer airborne and is now on the landing surface.

In other embodiments, the input signal 205 may be from a pressure sensor, and the "weight-on-wheels" condition may result from a detection, by the pressure sensor, of a change of pressure on the landing gear 201 following touchdown. In other embodiments, the pressure sensor may detect a specific pressure or a relative pressure. Other examples of a "weight-on-wheels" condition include a detection of a specific value, a relative value, or a change of value of one of the following: a load, a time, an altitude, an atmospheric pressure, an atmospheric temperature, an aircraft speed (for example, a ground speed), a position (for example, of a landing gear or a portion of the landing gear (for example, a suspension component such as a strut), or a landing gear door or a portion of the landing gear).

Figure 3:
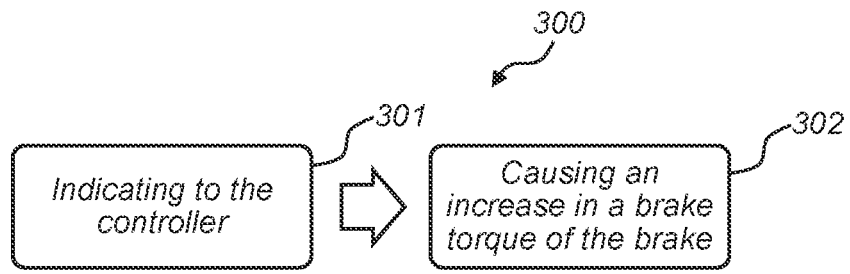
FIG. 3 is a flow diagram illustrating a method of controlling a park brake of an aircraft according to an embodiment.

FIG. 3 is a flow diagram illustrating a method 300 of controlling a park brake of an aircraft, such as the aircraft 100 described above with reference to FIG. 1.

At block 301, the method 300 comprises indicating to the controller of touchdown of the aircraft, wherein the indication is generated in response to detection of the touchdown of the aircraft. At block 302, the method 300 comprises causing an increase in a brake torque of the park brake on the basis of the indication to the controller. As noted above, the increase in brake torque may be gradual, and may increase over a period of time (perhaps according to a predetermined profile) between an initial brake torque and a final brake torque.

Figure 4:
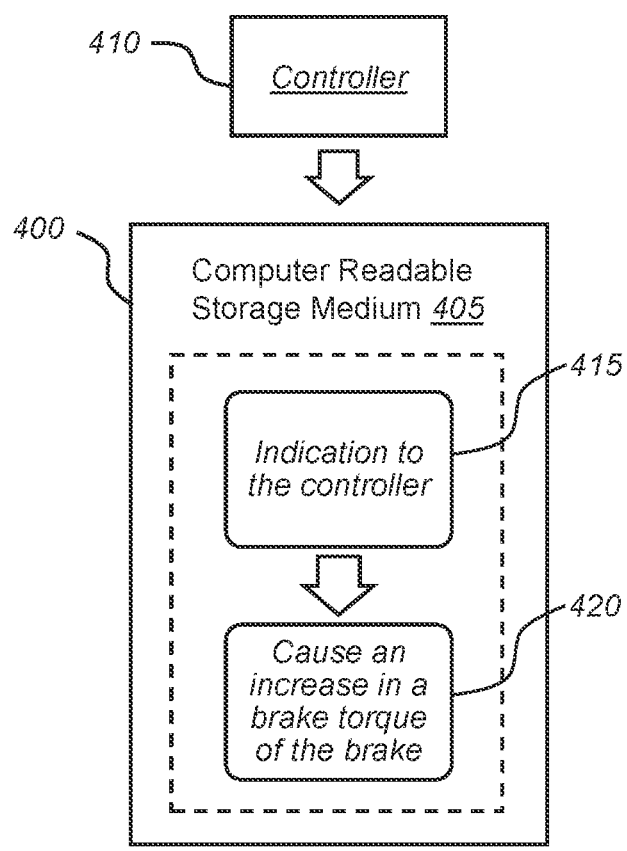
FIG. 4 is a schematic illustration of a set of computer readable instructions within a non-transitory computer-readable storage medium according to an embodiment.

A schematic illustration of a set of computer readable instructions 400 within a non-transitory computer-readable storage medium 405 according to an embodiment is shown in FIG. 4. The set of computer readable instructions are executed by a controller 410 of a brake control system for an aircraft, for example the controller 201 of the brake control system 200 described above in relation to FIG. 2. When executed, the instructions cause the controller to cause 420 an increase in a brake torque of the park brake on the basis of an indication 415 to the controller, the indication being generated in response to touchdown of the aircraft.

In the embodiment of FIG. 1, the brakes 110, 120 are hydraulically actuatable, such that relative movement of the calliper with respect to the disc is achieved by hydraulic pressure to exert a brake torque, which is a clamping force. In other embodiments, the park brake or park brakes may be electromechanically actuatable, such that relative movement of the calliper with respect to the disc is achieved by electrical energy to exert the brake torque.

In some embodiments, the brake control system 200 described above with reference to FIG. 2 may be installed in an aircraft, such as the aircraft 100 described above with reference to FIG. 1. Although a single piston is described in the embodiment of FIG. 2, in other embodiments, the brake calliper comprises a plurality of actuatable pistons.

Advantageously, features of the embodiments described herein provide improved brake control of an aircraft. Advantageously, a lifespan of an aircraft is increased. More specifically, a lifespan of a consumable item, such as a park brake and/or a tyre is increased. Advantageously, an integrity of a landing gear and/or an airframe of the aircraft is increased. The improved brake control allows a punctual landing to be reliably obtained without compromising an aircraft condition. Advantageously, a chance of brake slip is reduced and control of movement of the aircraft on touchdown, such as a retardation, is improved. This helps to preserve a structural integrity of the airframe and provide improved comfort to occupants of the aircraft.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A brake control system for controlling a park brake of an aircraft, the brake control system comprising a controller configured to cause an increase in a brake torque of the park brake based on an indication to the controller, the indication generated in response to touchdown during landing of the aircraft.

2. The brake control system according to claim 1, wherein the increase in brake torque is a progressive increase in the brake torque of the park brake during landing.

3. The brake control system according to claim 1, wherein the controller is configured to cause the increase in the brake torque of the park brake according to a predetermined profile.

4. The brake control system according to claim 3, wherein the controller is configured to cause the increase during the landing in the brake torque of the park brake based on a selection of a predetermined profile from a plurality of predetermined profiles.

5. The brake control system according to claim 1, wherein the controller is configured to cause an initial brake torque to increase during the landing to a final brake torque by at least five percent in response to an indication of the touchdown to the controller.

6. The brake control system according to claim 1, wherein the controller is configured to cause contact between braking surfaces of the park brake when the aircraft is airborne before touchdown.

7. The brake control system according to claim 1, wherein the controller is configured to cause application of an initial brake torque of the park brake when the aircraft is airborne before touchdown.

8. The brake control system according to claim 7, wherein the initial brake torque is in a range of greater than zero to less than 100 percent a maximum brake torque.

9. The brake control system according to claim 7, wherein the initial brake torque is selected based on an objective for braking the aircraft on touchdown from a plurality of objectives for braking the aircraft on touchdown.

10. The brake control system according to claim 9, wherein at least one of the plurality of objectives comprises a location for landing the aircraft.

11. An aircraft comprising the brake control system according to claim 1.

12. The aircraft according to claim 11, wherein the aircraft is a vertical and/or short take-off and landing aircraft.

13. A method of controlling a park brake of an aircraft, the method comprising:
causing an increase in a brake torque of the park brake based on an indication to the controller, wherein the indication is generated in response to touchdown during landing of the aircraft.

14. A non-transitory computer readable storage medium comprising a set of computer-readable instructions stored thereon, which, when executed by a controller of a brake control system for an aircraft, cause the controller to cause an increase in a brake torque of the park brake based on an indication to the controller, the indication being generated in response to touchdown during landing of the aircraft.

15. A brake management tool for managing operation of a park brake of an aircraft, the brake management tool comprising a controller configured to cause a clamping torque of the park brake to rise on detection of a signal issued to the controller in response to touchdown during a landing of the aircraft to halt the aircraft.

* * * * *